(12) United States Patent  
Kuramoto et al.

(10) Patent No.: US 8,576,404 B2
(45) Date of Patent: Nov. 5, 2013

(54) OPTICAL INTERFEROMETER

(75) Inventors: Yoshiyuki Kuramoto, Utsunomiya (JP); Takamasa Sasaki, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 261 days.

(21) Appl. No.: 13/209,497

(22) Filed: Aug. 15, 2011

(65) Prior Publication Data

US 2012/0044500 A1 Feb. 23, 2012

(30) Foreign Application Priority Data

Aug. 19, 2010 (JP) ................... 2010-183603

(51) Int. Cl.
*G01B 9/02* (2006.01)
(52) U.S. Cl.
USPC ........................................... 356/486
(58) Field of Classification Search
USPC .................. 356/482, 486, 493, 498
See application file for complete search history.

(56) References Cited

U.S. PATENT DOCUMENTS 6,330,065 B1 12/2001 Hill
2002/0001086 A1* 1/2002 De Groot ................ 356/486

FOREIGN PATENT DOCUMENTS

JP 10-281717 A 10/1998

\* cited by examiner

*Primary Examiner* — Tarifur Chowdhury
*Assistant Examiner* — Jonathan Hansen
(74) *Attorney, Agent, or Firm* — Rossi, Kimms & McDowell LLP

(57) ABSTRACT

An optical interferometer including, an analyzer configured to calculate an air dispersion ratio of air in the dispersion measurement interferometer excluding the component gas on the basis of a detection result of a first partial pressure detector, to calculate dispersion of air in a distance measurement interferometer from the calculated air dispersion ratio and a detection result of a second partial pressure detector, and to calculate a geometrical distance of the optical path length difference between a reference surface and a target surface.

8 Claims, 6 Drawing Sheets

OPTICAL INTERFEROMETER

BACKGROUND OF THE INVENTION

1. Field of the Invention

The present invention relates to an optical interferometer to measure a distance and a position of a target.

2. Description of the Related Art

Conventionally, the method of measuring the distance by the optical interferometer is well-known. A distance measurement by the optical interferometer uses a signal of interference light (interference signal) generated by an interference between a reference beam which is reflected on a reference surface being the distance measurement reference and a test beam which is reflected on a target surface attached to a target, and thereby using a wavelength of the light as the scale. Since the wavelength changes by a refractive index of an optical path of the test beam, a high-accurate correction of the refractive index is essential in order to achieve a high-accurate length measurement in an atmosphere.

Japanese Patent Laid-Open No. H10-281717 discloses a method of correcting a refractive index with high accuracy in a general environment, namely environment which has a spatial distribution of atmosphere density. This method is well known as the two-color method because the refractive index and the distance is similarly measured based on optical path length of two wavelengths or more by using the refractive index dispersion of the atmosphere.

U.S. Pat. No. 6,330,065, in the specification, discloses a method of achieving a high-accurate correction of the refractive index by arranging an interferometer for dispersion measurement and calculating the dispersion of a measurement optical path of a distance measurement interferometer using the measurement result of the interferometer for dispersion measurement.

In the two-color method of Japanese Patent Laid-Open No. H10-281717, the refractive index dispersion is calculated by a refractive index expression such as Edlen equation. However, since the accuracy of the refractive index expression is no more than about $10^{-8}$, the method lacks the accuracy for the high-accurate correction, and causes an error of the refractive index dispersion in air compositions in the length measurement environment.

Moreover, in the method described in U.S. Pat. No. 6,330,065, when the atmosphere composition of the optical path measured by the interferometer for dispersion measurement is different from that of the optical path measured by the interferometer for distance measurement, the air dispersion has the difference between the interferometer for dispersion measurement and the interferometer for distance measurement. Therefore, the correction accuracy of the refractive index decreases.

SUMMARY OF THE INVENTION

The present invention provides an optical interferometer which is capable of the high accurate correction of the refractive index even when the air composition has the spatial distribution.

An optical interferometer as one aspect of the present invention that calculates a geometrical distance of an optical path length difference between a reference surface and a target surface by measuring the optical path length difference using a multi-wavelength light source for interference measurement, includes a light source for partial pressure measurement, a dispersion measurement interferometer for measuring a dispersion of air for wavelengths of the multi-wavelength light source, a first partial pressure detector for measuring a partial pressure of a component gas in air in the dispersion measurement interferometer, a distance measurement interferometer for measuring the optical path length difference between the reference surface and the target surface with respect to the wavelengths of the multi-wavelength light source, a second partial pressure detector for measuring a partial pressure of the component gas in air in the distance measurement interferometer, and an analyzer configured to calculate an air dispersion ratio (rate) of air in the dispersion measurement interferometer excluding the component gas on the basis of a detection result of the first partial detector, to calculate dispersion of the air in the distance measurement interferometer from the calculated air dispersion ratio and a detection result of the second partial pressure detector, and to calculate the geometrical distance of the optical path length difference between the reference surface and the target surface.

Further features of the present invention will become apparent from the following description of exemplary embodiments with reference to the attached drawings.

DESCRIPTION OF THE PREFERRED EMBODIMENTS

Exemplary embodiments of the present invention will be described with reference to the accompanying drawings hereinafter.

[Embodiment 1]

Figure 1:
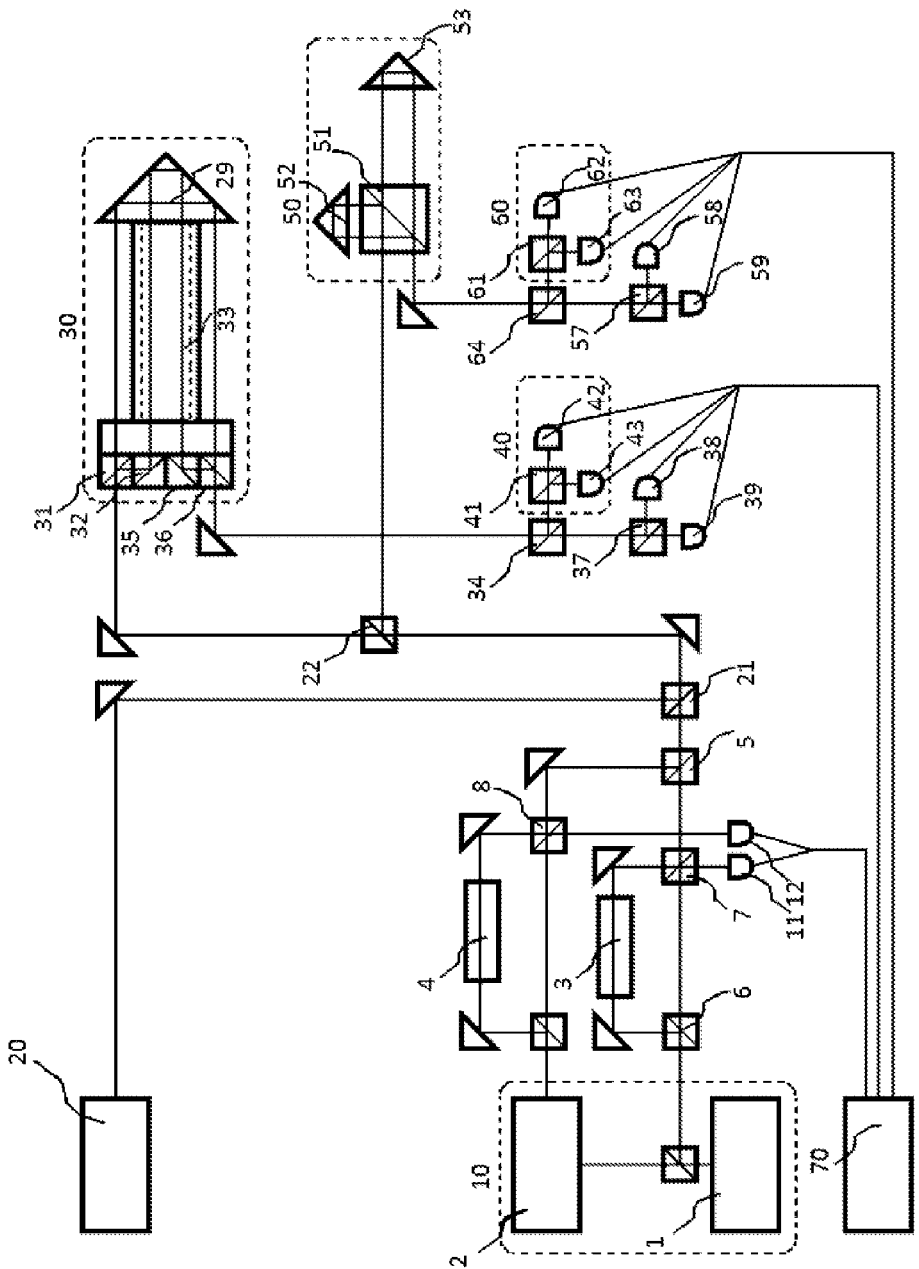
FIG. 1 is a diagram illustrating an optical interferometer of the present invention. (embodiment 1)

FIG. 1 is a diagram illustrating a configuration of an interferometer in embodiment 1 of the present invention. An optical interferometer (optical interference measuring apparatus) of embodiment 1 includes a multi-wavelength light source for interference measurement 10, a light source for partial pressure measurement 20, a dispersion measurement interferometer 30, a first partial pressure detector 40, a distance measurement interferometer 50, a second partial pressure detector 60, and an analyzer 70.

An optical interferometer will be described with reference to FIG. 1 hereinafter.

A beam (hereinafter referred to as fundamental beam) having a single frequency spectrum and emitted from a light source 1 separates by a non-polarization beam splitter (NPBS), and introduces a part of the beam into a second harmonic generator 2. The second harmonic generator 2 emits a beam (hereinafter referred to as second harmonic beam) having half the wavelength of the fundamental beam using a nonlinear optical element. If the second harmonic beam generator 2 uses a periodical poled lithium niobate (PPLN), it can be moderated in price and compact. Even if non-PPLN is used, highly-efficient wavelength conversion can be achieved by using an external resonator or arranging the nonlinear optical element in a resonator inside the light source 1. In this case, the apparatus not using PPLN has a configuration more complex than when the PPLN is used, but is usable even in the wavelength less than a transmissive wavelength band of PPLN. The multi-wavelength light source 10 is a two wavelength light source including the light source 1 and the second harmonic beam generating unit 2.

The fundamental beam emitted from the multi-wavelength light source 10 is separated into two at a NPBS 6, one enters a frequency shift unit 3. Hereinafter, a beam through the frequency shift unit 3 is called "frequency shifted fundamental beam (fundamental wave frequency shift light flux)", and the other is called "fundamental beam (fundamental wave light flux)". The frequency shift unit 3 shifts a frequency of an incident beam by the amount of df, and the polarization rotation to a component perpendicular to an incident component is performed thereafter. The frequency shift is performed in an acoustooptic modulator (AOM). The frequency shift amount is controlled with high accuracy by a reference generator (not shown). The frequency shifted fundamental beam (fundamental wave frequency shift light flux) emitted from the frequency shift unit 3 is coupled with the fundamental beam at a NPBS 7 and is separated into two thereafter. One of the separated beams enters a fundamental beam reference signal detector (fundamental wave reference signal detector) 11, and an interference signal $I_{ref}(\lambda_1)$ between the frequency shifted fundamental beam and the fundamental beam is generated. It is represented by expression 1.

[Expression 1]

$$I_{ref}(\lambda_1) = I_1 \cos\left(2\pi\left(df \cdot t + \frac{OPD_1(\lambda_1)}{\lambda_1}\right)\right) \quad (1)$$

λ1 represents a vacuum wavelength of the fundamental beam, OPD1(λ1) represents the optical path length difference between the frequency shifted fundamental beam and the fundamental beam to the fundamental beam reference signal detector 11. The interference signal $I_{ref}(\lambda_1)$ is measured by the analyzer 70.

As well as the fundamental beam, in a second harmonic beam (wave) emitted from the multi-wavelength light source 10, an interference signal $I_{ref}(\lambda_2)$ represented in the following expression 2 is generated by using a frequency shift unit for second harmonic beam 4.

[Expression 2]

$$I_{ref}(\lambda_2) = I_2 \cos\left(2\pi\left(df \cdot t + \frac{OPD_2(\lambda_{21})}{\lambda_2}\right)\right) \quad (2)$$

Interference signal $I_{ref}(\lambda_2)$ is detected in the second harmonic beam reference signal detector 12, λ2 represents a vacuum wavelength of the second harmonic beam, $OPD_2(\lambda_2)$ represents the optical path length difference between the frequency shifted second harmonic beam (second harmonic wave frequency shift light flux) and the second harmonic beam to the second harmonic beam reference signal detector 12. The interference signal detected in the second harmonic beam reference signal detector 12 is measured by the analyzer 70.

A fundamental beam which transmits the NPBS 7 and then enters a dicroic mirror (DIM) 5 is coupled with a second harmonic beam which transmits an NPBS 8 and then enters the DIM 5.

Figure 2:
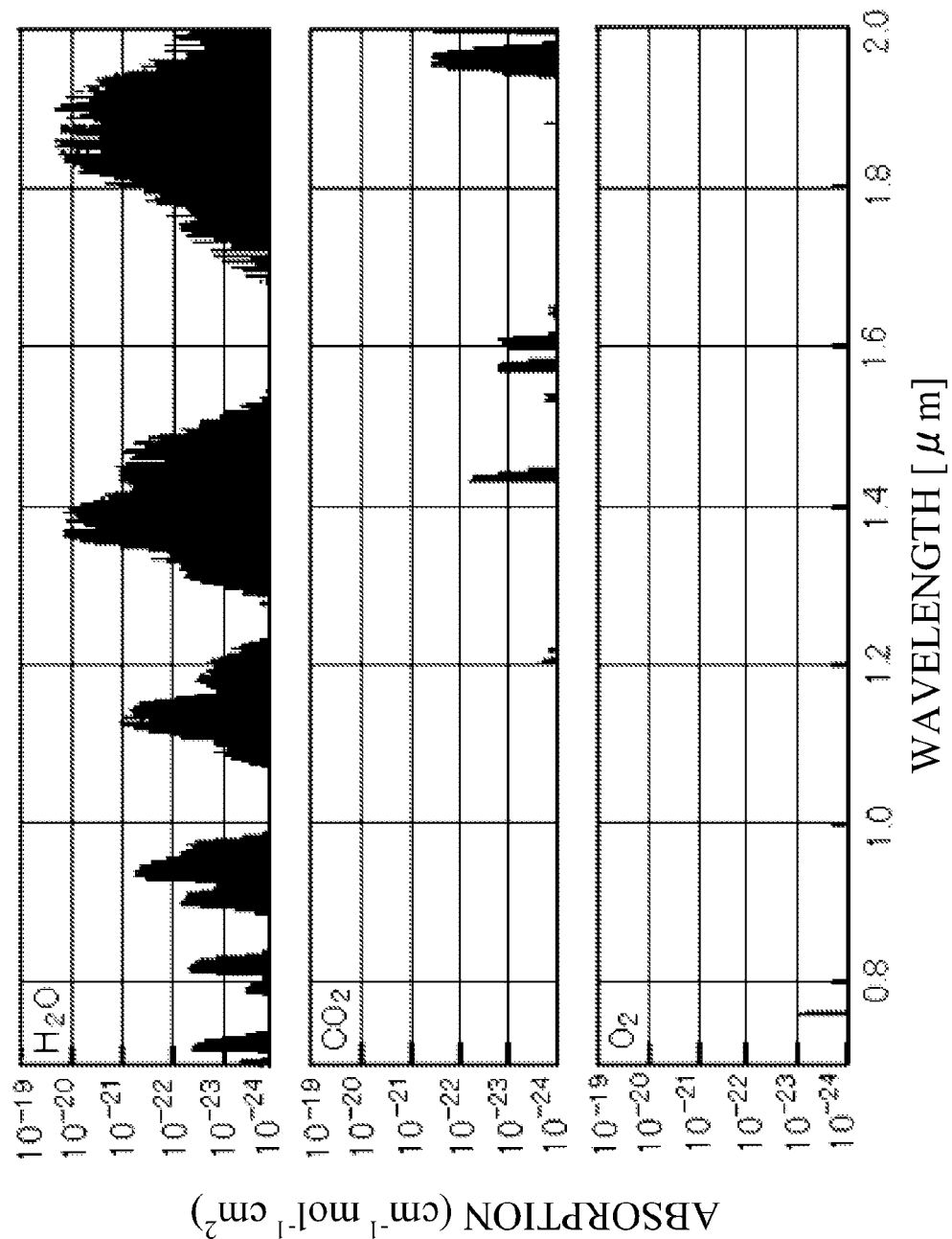
FIG. 2 is a diagram illustrating absorption lines of a typical air composition gas.

The fundamental beam and second harmonic beam which have been transmitted the DIM5 enters a DIM21, and are coupled with a beam emitted from the light source for partial pressure measurement 20. Since an air composition gas for which the partial measurement is performed is water vapor in embodiment 1, a DFB laser having a wavelength equal to the water vapor absorption line is used in the light source for partial pressure measurement 20. FIG. 2 illustrates a wavelength distribution of an absorption line intensity of water vapor, dioxide carbon, and oxygen which are representative air composition gases (component gas). The water vapor has an absorption band of 0.9 μm, 1.1 μm, and 1.4 μm in a near infrared wavelength region, and therefore the wavelength of the light source for partial pressure measurement 20 simply needs to be defined depending on a necessary absorption intensity. When performing the partial pressure measurement of dioxide carbon or oxygen, since their absorption line wavelengths are about 0.75~2.0 μm, the DFB laser can be used as the light source for partial pressure measurement 20.

The beams emitted from the multi-wavelength light source 10 and the light source for partial pressure measurement 20 are coupled by the DIM 21, and the coupled beam is split into two by the NPBS 22. A transmitted beam enters the dispersion measurement interferometer 30, and a reflected beam enters the distance measurement interferometer 50.

A beam which has entered the dispersion measurement interferometer 30 is split into two at a polarization beam splitter (PBS) 31. With regard to a beam emitted from the multi-wavelength light source 10, the fundamental beam and the second harmonic beam transmits the PBS 31, and the frequency shifted fundamental beam and frequency shifted second harmonic beam are reflected by the PBS 31. The beam emitted from the light source for partial pressure measurement 20 is split into two by the PBS 31. Hereinafter, the light flux which transmitting the PBS 31 is called "dispersion test beam", and the light flux reflected by the PBS 31 is called "dispersion reference beam". The dispersion reference beam proceeds in parallel to the dispersion test beam by being reflected on a mirror 32 after being reflected by the PBS 31, and enters a vacuum cell 33 thereafter. Since the vacuum cell 33 has the length $L_1$ and its inside is vacuum locked, the dispersion reference beam proceeds by the length $L_1$ in a vacuum. The beam which has transmitted the vacuum cell 33 is reflected by a corner cube 29, again transmits the vacuum cell 33, is reflected on a mirror 35, and is reflected by a PBS 36. On the other hand, the dispersion test beam proceeds by the same length $L_1$ as the vacuum cell 33 in the air, is reflected by the corner cube 29, again proceeds in the air, and is coupled with the dispersion reference beam in the PBS 36. Embodiment 1 uses the above configuration where the optical path length in the dispersion measurement interferometer 30 is two lengths thereof, but an interferometer having other configurations also can be used, as long as a configuration of a differential interferometer where a test beam and a reference beam are parallel to each other and where the reference beam transmits in a vacuum sell is used. For example, a differential plane mirror interferometer is often used for a wavelength correction of an interferometer. The differential plane mirror interferometer usable in a wavelength of the multi-wavelength light source 10 and the light source for partial pressure measurement 20 can be used as the dispersion measurement interferometer.

An environmental measuring instrument (not shown) is arranged near the dispersion measurement interferometer 30. An environmental value which is used in an initialize of the dispersion measurement interferometer, such as temperature, atmospheric pressure, and humidity, can be acquired from the analyzer 70.

The beam emitted from the dispersion measurement interferometer 30 is split into beams of the multi-wavelength light source 10 and the light source for partial pressure measurement 20 by a DIM 34.

The beam emitted from the light source for partial pressure measurement 20 is reflected by the DIM 34, and enters the first partial pressure detector 40. The beam is again split into a component of the dispersion reference beam and a component of the dispersion test beam by a PBS 41 in the first partial pressure detector 40, and the intensities of the components of the dispersion reference beam and the dispersion test beam are respectively detected by a detector 42 and a detector 43. The light amount detected by the detector 42 is defined as $I_{1ref}$ and the light amount detected by the detector 43 is defined as $I_{1test}$. Further, when the absorption line intensity of water vapor is defined as S, the normalized profile function of the absorption line is defined as $\psi(\lambda)$, and the partial pressure of the water vapor in the test optical path of the dispersion measurement interferometer 30 is defined as $P_{w1}$, the following expression 3 is derived from the relationship of transmittance.

[Expression 3]

$$\frac{I_{1test}(\lambda_3)}{I_{1ref}(\lambda_3)} = \exp[-p_{w1} \cdot S \cdot \varphi(\lambda_3) \cdot 2L_1] \quad (3)$$

Detection signals acquired from the detector 42 and the detector 43 are measured by the analyzer 70.

The beam emitted from the multi-wavelength light source 10 that has transmitted the DIM 34 is split into the fundamental beam and the second harmonic beam by a DIM 37, and the fundamental beam and the second harmonic beam are respectively detected by the detector 38 and the detector 39. Interference signals detected by the detector 38 and the detector 39 are respectively defined as the fundamental beam dispersion signal $I_{1meas}(\lambda1)$ and the second harmonic beam dispersion signal $I_{1meas}(\lambda2)$, and the following expression (4) and (5) are satisfied.

[Expression 4]

$$I_{1meas}(\lambda_1) = I_3 \cos\left(2\pi\left(df \cdot t + \frac{OPD_1(\lambda_1)}{\lambda_1} + \frac{2(n_1(\lambda_1)-1)L_1}{\lambda_1}\right)\right) \quad (4)$$

[Expression 5]

$$I_{1meas}(\lambda_2) = I_4 \cos\left(2\pi\left(df \cdot t + \frac{OPD_2(\lambda_2)}{\lambda_2} + \frac{2(n_1(\lambda_2)-1)L_1}{\lambda_2}\right)\right) \quad (5)$$

The detection signals acquired from the detector 38 and the detector 39 are measured by the analyzer 70.

On the other hand, the beam reflected by the NPBS 22 enters the distance measurement interferometer (length measurement interferometer) 50, and is separated into two by the PBS 51. With regard to the beam emitted from the multi-wavelength light source 10, the fundamental beam and the second harmonic beam transmits the PBS 51, and the frequency shifted fundamental beam and the frequency shifted second harmonic beam are reflected by the PBS 51. The beam emitted from the light source for partial pressure measurement 20 is separated into two by the PBS 51. Hereinafter, beam transmitting the PBS 51 is called as "distance measurement test beam (length measuring test light flux)", and beam reflected by the PBS 51 is called as "distance measurement reference beam (length measuring reference light flux)". The distance measurement reference beam is reflected by the PBS 51, and then is reflected by a reference surface 52 fixed at a distance measurement reference (measurement reference position). A corner cube is used as the reference surface 52. The reference surface 52 does not always need to be fixed at the distance measurement reference, and an interferometer unit where the PBS 51 and the reference surface 52 are integrated may be arranged at the distance measurement reference. The distance measurement reference beam reflected on the reference surface 52 enters and is reflected by the PBS 51 again. On the other hand, the distance measurement test beam that has transmitted the PBS 51 is reflected on the target surface 53 arranged on a target object. In the target surface 53, a corner cube is used. The distance measurement test beam reflected on the target surface 53 enters and transmits the PBS 51, and is coupled with the distance measurement reference beam.

In embodiment 1, a linear interferometer that uses the corner cubes as the target surface 53 and the reference surface 52 is adapted as the interferometer, but a plane interferometer or a differential plane mirror interferometer may be used.

The beam emitted from the distance measurement interferometer 50 is split into the beam emitted from the multi-wavelength light source 10 and the beam emitted from the light source for partial pressure measurement 20 by a DIM 64.

The beam emitted from the light source for partial pressure measurement 20 which has been reflected by the DIM 64 enters the second partial pressure detector 60. Along with the first partial pressure detector 40, the beam incident to the second partial pressure detector 60 is split into a component of the distance measurement reference beam component and a component of the distance measurement test beam by the PBS 61, and they are detected by a detector 62 and a detector 63. When intensity detected by the detector 62 is defined as $I_{2ref}$, intensity detected by the detector 63 is defined as $I_{2test}$, the average water vapor pressure on the optical path of the distance measurement test optical path is defined as $P_{w2}$, and the geometrical distance of the optical path difference between the distance measurement test beam and the distance measurement reference beam is defined as $L_2$, the following expression (6) is satisfied.

[Expression 6]

$$\frac{I_{2test}(\lambda_3)}{I_{2ref}(\lambda_3)} = \exp[-p_{w2} \cdot S \cdot \phi(\lambda_3) \cdot 2L_2] \quad (6)$$

The detection signals obtained from the detector 62 and the detector 63 is measured by the analyzer 70.

The beam emitted from the multi-wavelength light source 10 that has transmitted the DIM 64 is split into the fundamental beam and the second harmonic beam by the DIM 57, and the fundamental beam and the second harmonic beam are respectively detected by a detector 58 and a detector 59. When the interference signals detected by the detector 58 and the detector 59 are respectively defined as a fundamental beam distance measurement signal $I_{2meas}(\lambda_1)$ and a second harmonic beam distance measurement signal $I_{2meas}(\lambda_2)$, the following expression (7) and (8) are satisfied.

[Expression 7]

$$I_{2meas}(\lambda_1) = I_5 \cos\left(2\pi\left(df \cdot t + \frac{OPD_1(\lambda_1)}{\lambda_1} + \frac{2n_2(\lambda_1)L_2}{\lambda_1}\right)\right) \quad (7)$$

[Expression 8]

$$I_{2meas}(\lambda_2) = I_6 \cos\left(2\pi\left(df \cdot t + \frac{OPD_2(\lambda_2)}{\lambda_2} + \frac{2n_2(\lambda_2)L_2}{\lambda_2}\right)\right) \quad (8)$$

The detection signals acquired from the detector 58 and the detector 59 are measured by the analyzer 70.

Figure 3:
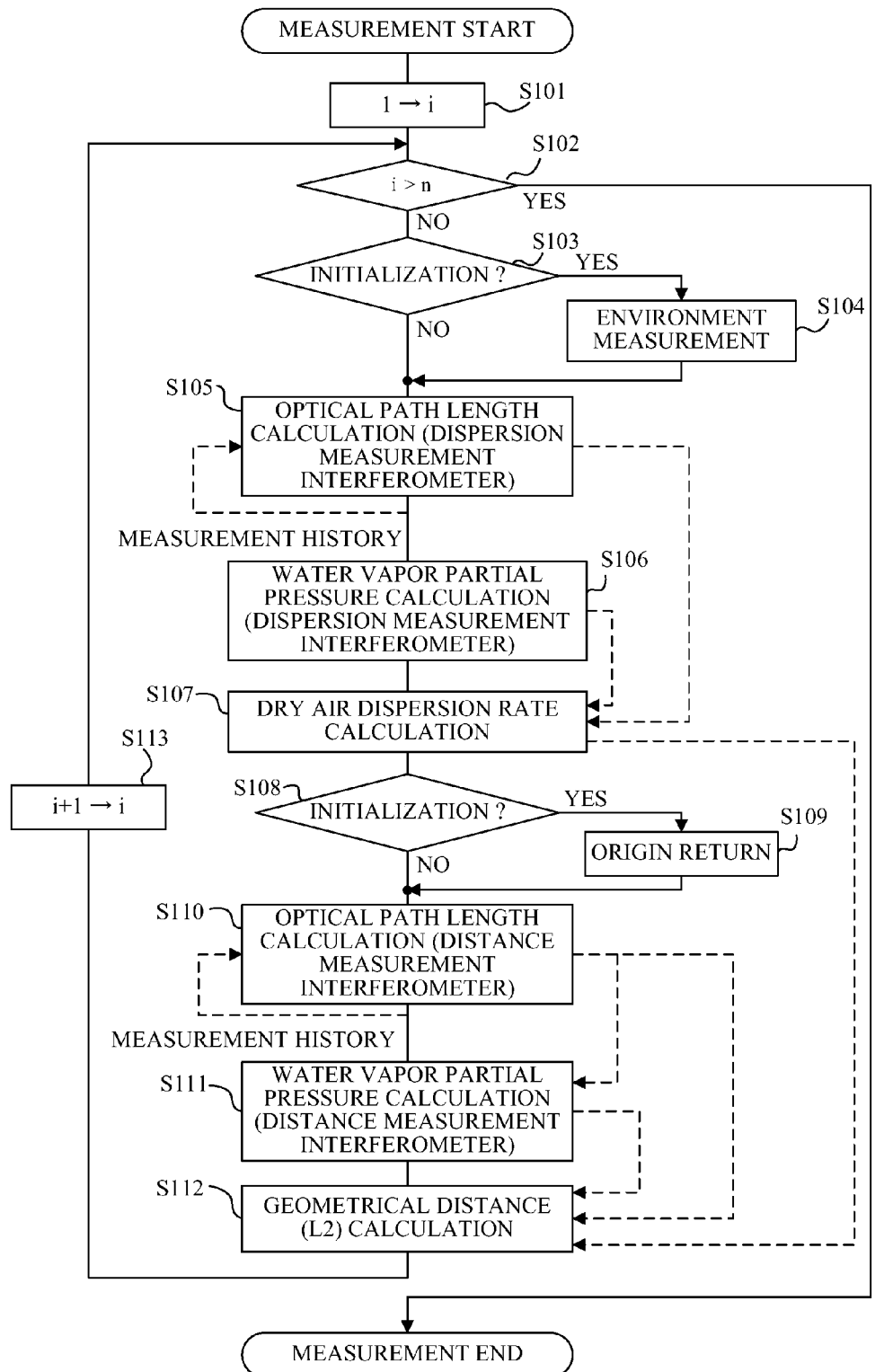
FIG. 3 is a flow chart executed by an analyzer of the present invention. (embodiment 1)

The description of the apparatus configuration has completed above, and in what follows, details of a measurement method in the analyzer 70 are described on the basis of FIG. 3.

FIG. 3 illustrates a calculation flow executed by the analyzer 70 in embodiment 1. The calculation flow includes a process S107 in which the dispersion ratio of dry air (air excluding water vapor) is calculated from the detection result of the optical path length and the water vapor partial pressure in the dispersion measurement interferometer (dispersion interferometer) 30, and a process S112 in which the geometrical distance is calculated from the dry air dispersion ratio and the detection result of the optical path length and the water vapor partial pressure in the distance measurement interferometer 50. The dotted line represents a flow of data.

After the measurement is started, a repetition measurement loop in a process S102 is executed. The measurement is performed predetermined times, and is completed. In what follows, the affixing character of i indicates that it is the measurement result of an i-th measurement loop.

In a process S103, the necessity of the initialization of the dispersion measurement interferometer 30 is determined. The dispersion measurement interferometer 30 in embodiment 1 is a relative measurement type which measures a relative position change in measurement history. Therefore, for example, in the case of a first measurement loop or in the case where light is shaded in an interferometer optical axis, the initialization is needed because measurement values cannot be defined.

When it is determined that the initialization is necessary in the process S103, an environmental measurement around the dispersion measurement interferometer is executed in a process S104.

The optical path length of the dispersion measurement interferometer 30 is calculated in a process S105. First, the phase difference $\phi_1(\lambda_1)$ between the fundamental beam reference signal and the fundamental beam dispersion signal and the phase difference $\phi_1(\lambda_2)$ between the second harmonic beam reference signal and the second harmonic beam dispersion signal are measured by using a phase meter inside the analyzer 70. The optical path lengths of the fundamental beam and the harmonic beam are respectively shown by the following expression (9).

[Expression 9]

$$\begin{cases} OPL_1(\lambda_1) \equiv 2(n(\lambda_1)-1)L_1 = \lambda_1(N_{11} + \phi_1(\lambda_1)) \\ OPL_1(\lambda_2) \equiv 2(n(\lambda_2)-1)L_1 = \lambda_2(N_{12} + \phi_1(\lambda_2)) \end{cases} \quad (9)$$

$N_{11}$ and $N_{12}$ represent the order of interferences in each measurement wavelength. The order of interferences $N_{11}$ and $N_{12}$ are calculated by using expression (10) or (11).

When the normalization is executed in the process S103, the environmental measurement result of the process S104 is used and the order of interference is calculated by expression (10). The formula for computation of the refractive index from the environmental measurement value is defined as $n(\lambda, t, p, p_w)$, and Edlen equation or Ciddor equation can be used. The function that rounds an argument to the integer is represented as round ( )

[Expression 10]

$$\begin{cases} N_{11} = \text{round}\left(\frac{2(n_1(\lambda_1, t, p, p_w)-1)L_1}{\lambda_1} - \phi_1(\lambda_1)\right) \\ N_{12} = \text{round}\left(\frac{2(n_1(\lambda_2, t, p, p_w)-1)L_1}{\lambda_2} - \phi_1(\lambda_2)\right) \end{cases} \quad (10)$$

The i-th measurement loop where the initialization is unnecessary is calculated from the measurement value of a (i−1)-th measurement loop based on the expression (11).

[Expression 11]

$$\begin{cases} N_{11(i)} = N_{11(i-1)} - \text{round}(\phi_{1(i)}(\lambda_1) - \phi_{1(i-1)}(\lambda_1)) \\ N_{12(i)} = N_{12(i-1)} - \text{round}(\phi_{1(i)}(\lambda_2) - \phi_{1(i-1)}(\lambda_2)) \end{cases} \quad (11)$$

The water vapor partial pressure is calculated in a process S106. A partial pressure pw1 of the water vapor in the dispersion measurement interferometer is calculated from the measurement results $I_{1ref}$ and $I_{1test}$ of the first partial pressure detector 40 by using expression (12) where expression (3) is modified.

[Expression 12]

$$p_{w1} = \frac{-1}{S \cdot \varphi(\lambda_3) \cdot 2L_1} \log\left(\frac{I_{1test}(\lambda_3)}{I_{1ref}(\lambda_3)}\right) \quad (12)$$

In a process S107, the dispersion ratio of air excluding water vapor (dry air or air excluding a component gas) is calculated from the calculation result of the optical path length and the water vapor partial pressure acquired from the optical path length measurement result. In general, the refractive index expression of air is approximated as the following expression 13.

[Expression 13]

$$n(\lambda, t, p, p_w) \cong 1 + D(t, p, x)K(\lambda) + g(\lambda)p_w \quad (13)$$

The density term of air that depends on temperature t, pressure and carbon dioxide concentration x is represented as D, the dispersion of dry air is represented as $K(\lambda)$, and the dispersion of water vapor is represented as $g(\lambda)$. Expression (13) is represented only with respect to the water vapor partial pressure, but it also is possible to be formulated in terms of other air composition gases. Specifically, the product of a dispersion term specific to gas and a gas partial pressure is added to expression (13). The dispersion ratio of dry air is calculated from expression (14) based on expression (9) and (12).

[Expression 14]

$$\frac{K(\lambda_1)}{K(\lambda_2)} = \frac{OPL_1(\lambda_1) - 2L_1 \cdot g(\lambda_1) \cdot p_w}{OPL_1(\lambda_2) - 2L_1 \cdot g(\lambda_2) \cdot p_w} \quad (14)$$

The calculation flow in the dispersion measurement interferometer 30 has completed above. In what follows, the calculation flow of the distance measurement interferometer 50 is described.

In a process S108, the necessity of the initialization of the distance measurement interferometer 50 is determined. As well as the process S103, for example, in the case of the first measurement loop or in the case where light is shaded in the interferometer optical axis, the initialization is needed because the measurement values cannot be defined.

When the necessity of the initialization is determined in the process S108, the origin return is executed in a process S109. In the origin return, the target is driven, and the order of interference is determined by using the measurement value from the distance measurement reference position when the target passes through a photoswitch arranged in a known position. When the origin return is performed, the environment measurement around the distance measurement interferometer is also performed at the same time. A detailed method of determining the order of interference is described in a process S110.

In the process S110, the optical path length of the distance measurement interferometer 50 is calculated. As well as the dispersion measurement interferometer 30, the phase difference $\phi_2(\lambda_1)$ between the fundamental beam reference signal and the fundamental beam distance measurement signal, and the phase difference $\phi_2(\lambda_2)$ between the second harmonic beam reference signal and the second harmonic beam distance measuring signal are measured by using a phase meter inside the analyzer 70. The optical path lengths of the fundamental beam and the second harmonic beam (a plurality of wavelengths) are represented as expression (15) by defining as $L_2$ the geometrical distance of the optical path difference of the distance measurement test beam and the distance measurement reference beam.

[Expression 15]

$$\begin{cases} OPL_2(\lambda_1) \equiv 2 \cdot n_2(\lambda_1) \cdot L_2 = \lambda_1(N_{21} + \phi_2(\lambda_1)) \\ OPL_2(\lambda_2) \equiv 2 \cdot n_2(\lambda_2) \cdot L_2 = \lambda_2(N_{22} + \phi_2(\lambda_2)) \end{cases} \quad (15)$$

$N_{21}$ and $N_{22}$ represent the order of interferences in expression (15). When the original return in the process S109 is performed, the position of the photoswitch is assumed to be $L_{ps}$ and the order of interference is calculated by expression (16).

[Expression 16]

$$\begin{cases} N_{21} = \text{round}\left(\frac{2n_2(\lambda_1, t, p, p_w)L_{ps}}{\lambda_1} - \phi_2(\lambda_1)\right) \\ N_{22} = \text{round}\left(\frac{2n_2(\lambda_2, t, p, p_w)L_{ps}}{\lambda_2} - \phi_2(\lambda_2)\right) \end{cases} \quad (16)$$

In the i-th measurement loop where the initialize is unnecessary, $N_{21}$ and $N_{22}$ are calculated from the measurement result of the (i−1)-th measurement loop by expression (17).

[Expression 17]

$$\begin{cases} N_{21(i)} = N_{21(i-1)} - \text{round}(\phi_{1(i)}(\lambda_1) - \phi_{1(i-1)}(\lambda_1)) \\ N_{22(i)} = N_{22(i-1)} - \text{round}(\phi_{2(i)}(\lambda_2) - \phi_{2(i-1)}(\lambda_2)) \end{cases} \quad (17)$$

In a process S111, the water vapor partial pressure in the optical path of the distance measurement test beam in the distance measurement interferometer 50 is calculated. Since the measurement result $I_{2ref}$, $I_{2test}$ in the second partial pressure detector 60 is represented by expression (6), the partial pressure $p_{w2}$ of the water vapor in the distance measurement interferometer is calculated by using expression (18).

[Expression 18]

$$p_{w2} = \frac{1}{S \cdot \varphi(\lambda_3) \cdot 2OPL_2} \log\left(\frac{I_{2test}(\lambda_3)}{I_{2ref}(\lambda_3)}\right) \quad (18)$$

The $OPL_2(\lambda_1)$ is used as an approximate value of L2 here. In general, since the optical path length and the geometrical (geometric) distance agree with each other by $10^{-4}$ orders, the partial pressure is calculated with sufficient accuracy. Even when the accuracy is insufficient, high accuracy calculation can be performed by calculating the partial pressure again by using $L_2$ calculated in a process S112.

In the process S112, the geometrical distance of the optical path difference of the distance measurement test beam and the distance measurement reference beam is calculated. When the expression of the optical path length in expression (15) is developed by using the expression of the refractive index in expression (13), the following expression (19) is derived.

[Expression 19]

$$\begin{cases} OPL_{2i}(\lambda_1) = 2 \cdot (1 + D(t, p, x) \cdot K(\lambda_1) + g(\lambda_1)p_{w2}) \cdot L_2 \\ OPL_{2i}(\lambda_2) = 2 \cdot (1 + D(t, p, x) \cdot K(\lambda_2) + g(\lambda_2)p_{w2}) \cdot L_2 \end{cases} \quad (19)$$

When the air density term $D(t, p, x)$ is canceled from expression (19) and it is solved for the geometrical distance $L_2$, the following expression (20) is derived.

[Expression 20]

$$L_2 = \frac{\frac{K(\lambda_1)}{K(\lambda_2)} OPL_2(\lambda_2) - OPL_2(\lambda_1)}{\frac{K(\lambda_1)}{K(\lambda_2)} - 1 + p_{w2}\left(g(\lambda_1) - g(\lambda_2)\frac{K(\lambda_1)}{K(\lambda_2)}\right)} \quad (20)$$

$L_2$ can be calculated by substituting to expression (20) the dry air dispersion ratio $K(\lambda_1)/K(\lambda_2)$ in the process S107, the optical path length $OPL_2(\lambda_1)$ and $OPL_2(\lambda_2)$ in the process S110, and the water vapor partial pressure pw2 in the process S111.

As described above, even when the air compositions of the dispersion measurement interferometer 30 and the distance measurement interferometer 50 disagree, the present invention can correct the influence by measuring the partial pressure of gas that causes disagreements between the air compositions. Further, if the dispersion ratio under an environment of the distance measurement is actually measured with regard to a common air composition component and it is applied to the calculation, the geometrical distance can be calculated with high accuracy.

[Embodiment 2]

Figure 4:
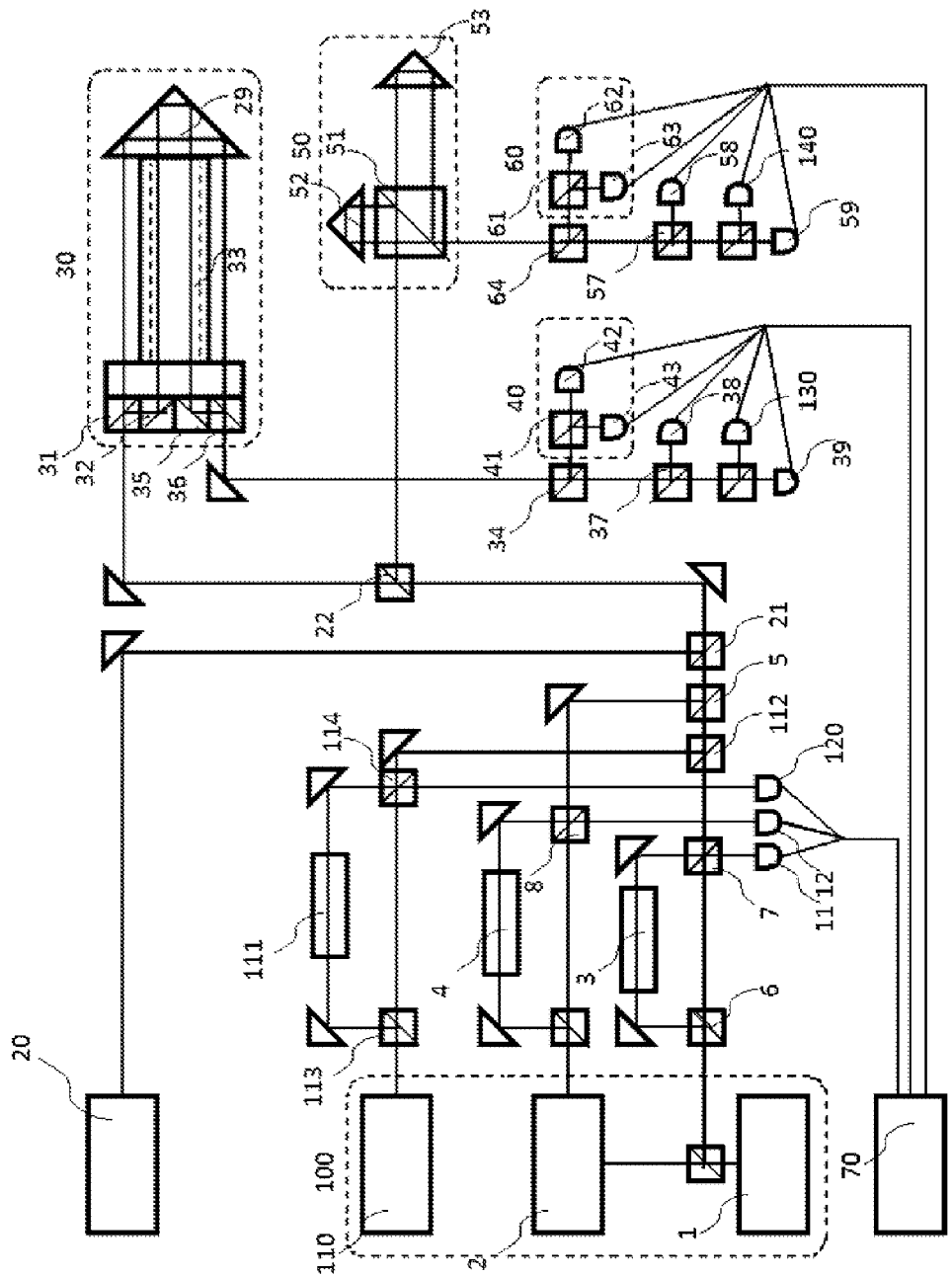
FIG. 4 is a diagram illustrating an optical interferometer of the present invention. (embodiment 2)

Next, embodiment 2 of the present invention is described with reference to FIG. 4. FIG. 4 is a diagram illustrating an apparatus configuration in embodiment 2 of the present invention.

In embodiment 2, a wavelength scanning light source 110 is added to the multi-wavelength light source 100, and detectors 120, 130 and 140 for detecting the optical path length of the wavelength of the wavelength scanning light source 110 are added, and thereby directly measuring the absolute optical path length including the order of interference.

Details will be described with reference to FIG. 4 hereinafter.

A beam emitted from the wavelength scanning light source 110 is split into two by a NPBS 113, and one enters a frequency shift unit 111. In what follows, a beam which transmits the frequency shift unit 111 is called "frequency shifted wavelength scanning beam (wavelength scanning frequency shift light flux)", and the other is called "wavelength scanning beam (light flux)".

A wavelength $\lambda_4$ of the wavelength scanning light source 110 time-varies, and repeats a scan between a wavelength $\lambda_{41}$ and a wavelength $\lambda_{42}$. The wavelength $\lambda_{41}$ and wavelength $\lambda_{42}$ are stabilized for a wavelength reference such as a gas cell and an etalon (not shown), and the stability of the wavelength is assumed to guaranteed.

Figure 5:
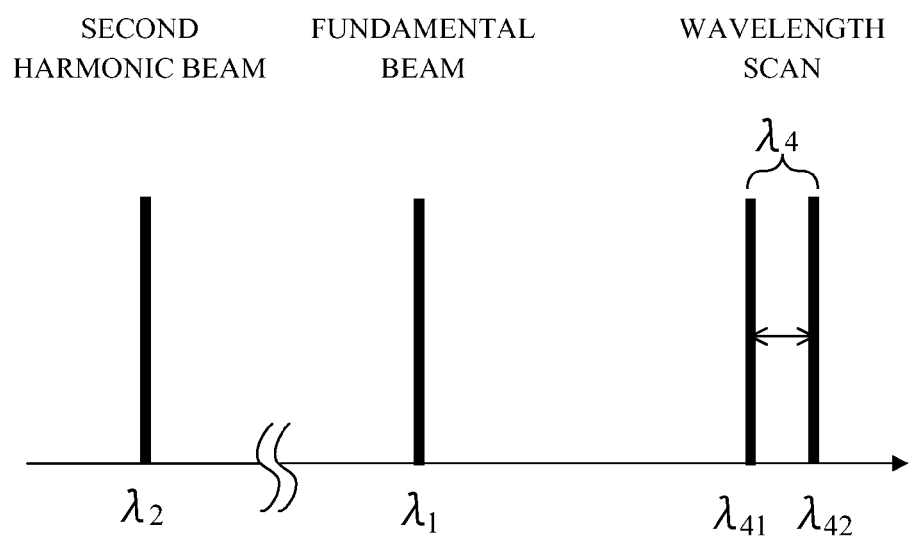
FIG. 5 is a diagram illustrating wavelengths of a light source for an interference measurement of the present invention. (embodiment 2)

FIG. 5 illustrates the relationship of a wavelength $\lambda_1$ of a fundamental beam, a wavelength $\lambda_2$ of a second harmonic beam, and the wavelengths $\lambda_{41}$ and $\lambda_{42}$ of the wavelength scanning light source. In order to determine an order of interference of an absolute optical path length to be described, the wavelength difference between $\lambda_1$ and $\lambda_{41}$ is defines as about 10 nm, and the wavelength difference between $\lambda_{41}$ and $\lambda_{42}$ is defined as about several 10 pm. If the wavelength difference between $\lambda_{41}$ and $\lambda_{42}$ is made smaller, the wavelength scan is achieved even in a low-cost light source such as DFB-LD.

As well as other frequency shift units, the reference shift unit 111 shifts the frequency by the amount of df, and then rotates polarized light to a component orthogonal to an incident component to emit it. The frequency shifted wavelength scanning beam emitted from the frequency shift unit 111 is coupled with the wavelength scanning beam and then is split into two, by a NPBS 114. A beam which enters a wavelength scanning reference signal detector 120 after transmitting the NPBS 114 is called "wavelength scanning reference beam", and the other is called "wavelength scanning measurement beam". The wavelength scanning reference beam is converted to an interference signal $I_{ref}(\lambda_4)$ represented by expression (21) in the wavelength scanning reference signal detector 120.

[Expression 21]

$$I_{ref}(\lambda_4) = I_5 \cos\left(2\pi\left(df \cdot t + \frac{OPD_3(\lambda_4)}{\lambda_4}\right)\right) \quad (21)$$

$\lambda_4$ represents a vacuum wavelength of the wavelength scanning beam, and $OPD_3(\lambda_4)$ represents the optical path length difference between the frequency shifted wavelength scanning beam and the wavelength scanning beam to the wavelength scanning reference signal detector 120. The interference signal $I_{ref}(\lambda_4)$ is measured by an analyzer 70.

The wave scanning measurement beam which has transmitted the NPBS 114 is coupled with the fundamental measurement beam in a DIM 112, and, as well as the fundamental measurement beam or the second harmonic measurement beam in embodiment 1, enters a dispersion measurement interferometer 30 and a distance measurement interferometer 50 to be each converted to interference signals. The interference signal in the dispersion measurement interferometer 30 of the wavelength scanning measurement beam is detected in the detector 130, and its interference signal (wavelength scanning dispersion signal) is represented by the following expression (22).

[Expression 22]

$$I_{1meas}(\lambda_4) = I_6 \cos\left(2\pi\left(df \cdot t + \frac{OPD_3(\lambda_4)}{\lambda_4} + \frac{2(n_1(\lambda_4) - 1)L_1}{\lambda_4}\right)\right) \quad (22)$$

Similarly, the interference signal in the distance measurement interferometer 50 of the wavelength scanning measurement beam is detected in the detector 140, and its interference signal (wavelength scanning length measuring signal) is represented by the following expression (23).

[Expression 23]

$$I_{2meas}(\lambda_4) = I_7 \cos\left(2\pi\left(df \cdot t + \frac{OPD_3(\lambda_4)}{\lambda_4} + \frac{2n_2(\lambda_4)L_2}{\lambda_4}\right)\right) \quad (23)$$

Figure 6:
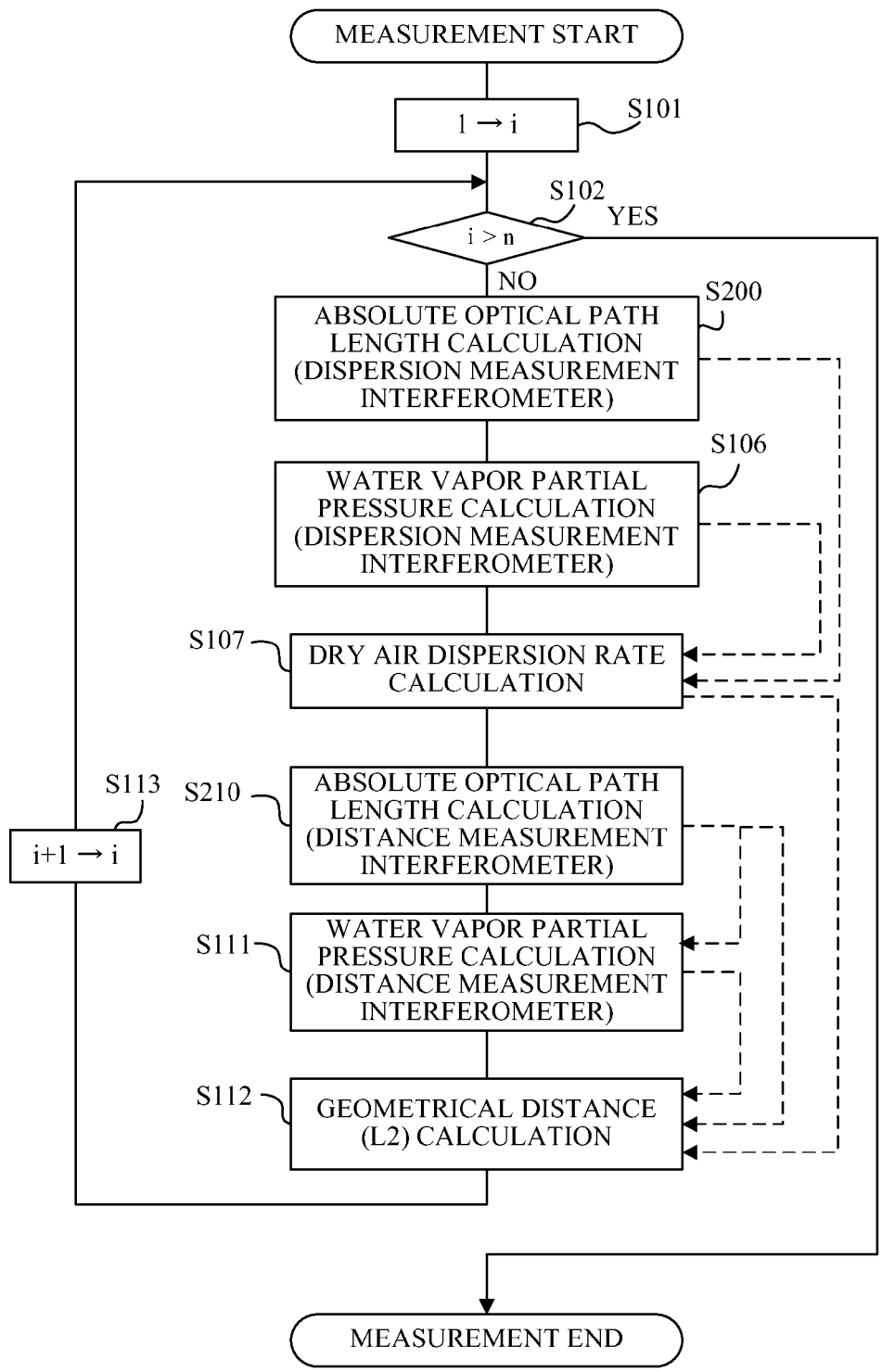
FIG. 6 is a flow chart executed by the analyzer of the present invention. (embodiment 2)

The description of the apparatus configuration has completed above. In what follows, the measurement flow will be described on the basis of FIG. 6. In the measurement flow of embodiment 2, a point that the initialization process becomes unnecessary and a point that the optical path length calculation process is replaced to an absolute optical path length calculation process are the modifications from embodiment 1.

The description of a process S102 is omitted since it is similar to embodiment 1.

The absolute optical path length of dispersion measurement interferometer 30 is calculated in a process S200. In general, a method of expanding a distance measurement range by using a synthetic wavelength corresponding to beats of two wavelengths $\lambda_a$, $\lambda_b$ is well known. Specially, when the synthetic wavelength of the two wavelengths $\lambda_a$, $\lambda_b$ is defined as $\Lambda_{ab} = \lambda_a \cdot \lambda_b / |\lambda_a - \lambda_b|$, interference phases are respectively represented as $\phi_a$ and $\phi_b$, and the distance measurement value is represented with respect to each the wavelength $\lambda_a$ and the synthetic wavelength $\lambda_{a,b}$ by the following expression (24).

[Expression 24]

$$L = \frac{\lambda_a(N_a + \phi_a)}{n(\lambda_a)} = \frac{\Lambda_{ab}(N_{ab} + \phi_a - \phi_b)}{n_g(\lambda_a, \lambda_b)} \quad (24)$$

$N_a$ and $N_{ab}$ respectively represents the order of interferences of the wavelength $\lambda_a$ and the synthetic wavelength $\Lambda_{ab}$, $n(\lambda_a)$ and $n_g(\lambda_a,\lambda_b)$ respectively represents the refractive index for the wavelength $\lambda_a$ and the group refractive index for the synthetic wavelength $\Lambda_{ab}$. Since the order of interference term exists in both expression of the wavelength $\lambda_a$ and the synthetic wavelength $\Lambda_{ab}$, an ambiguity by an integral multiple of wavelength exists. However, since $\Lambda_{ab} \gg \lambda_a$ is satisfied, the distance measurement range is expanded by the synthetic wavelength.

With respect to three wavelengths $\lambda_1$, $\lambda_{41}$, $\lambda_{42}$ in the dispersion measurement interferometer 30, the following expression 25 is derived by defining the synthetic wavelength of $\lambda_1$ and $\lambda_{41}$ as $\Lambda_{14}$ and defining the synthetic wavelength of $\lambda_{41}$ and $\lambda_{42}$ as $\Lambda_{44}$.

[Expression 25]

$$\frac{\lambda_1(N_1 + \phi_1(\lambda_1))}{n(\lambda)} = \frac{\Lambda_{14}(N_{14} + \phi_1(\lambda_1) - \phi_1(\lambda_{41}))}{n_g(\lambda_1, \lambda_{41})} \quad (25)$$
$$= \frac{\Lambda_{44}(N_{44} + \phi_1(\lambda_{41}) - \phi_1(\lambda_{42}))}{n_g(\lambda_{41}, \lambda_{42})}$$

As described above, since the wavelengths of the wavelength scanning light source 110 satisfies $\lambda_1 \ll (\lambda_{41}-\lambda_1) \ll (\lambda_{42}-\lambda_{41})$, the synthetic wavelength is defined as $\lambda_1 \ll \Lambda_{14} \ll \Lambda_{44}$. Moreover, in embodiment 2, the synthetic wavelength is set so that the length measuring accuracy of the synthetic wavelength becomes a short synthetic wavelength or ½ of the wavelength, or less. Accordingly, if each order of interference is sequentially determined from the calculation result of the longest synthetic wavelength $\Lambda_{44}$, the order of interference $N_1$ of the wavelength $\lambda_1$ can be determined. Furthermore, in the present invention, the longest synthetic wavelength $\Lambda_{44}$ is generated by the wavelength scan, and therefore the order of interference $N_{44}$ corresponds to the number of phase jumps caused while the wavelength scan is performed from the wavelength $\lambda_{41}$ to the wavelength $\lambda_{42}$. Accordingly, if the number of phase jumps is counted, the absolute length measurement within a length measuring range not less than the longest synthetic wavelength $\Lambda_{44}$ can be performed. Specially, the order of interferometer N1 is calculated by the following expression (26).

[Expression 26]

$$\begin{cases} N_1 = \text{round}\left(\frac{\Lambda_{14}}{\lambda_1}(N_{14} + \phi_1(\lambda_1) - \phi_1(\lambda_{41})) - \phi_1(\lambda_1)\right) \\ N_{14} = \text{round}\left(\frac{\Lambda_{44}}{\lambda_{14}}(N_{44} + \phi_1(\lambda_{14}) - \phi_1(\lambda_{42})) - (\phi_1(\lambda_1) - \phi_1(\lambda_{41}))\right) \end{cases} \quad (26)$$

Here, the refractive index and the group refractive index were assumed they were almost equal to each other, and are omitted. If the difference thereof is nonnegligible, a fixed value may be substituted on the basis of the estimated use environment, or the value of the environment measurement may be used.

In the above-mentioned method, the measurement result using the synthetic wavelength is used only in the determination of the order of interference $N_1$. Therefore, the optical path length can be measured with accuracy equal to a normal interference measurement in embodiment 1 while performing the absolute length measurement.

In addition, the determination of the order of interference in embodiment 2 is achieved by adding the wavelength scanning light source 110, but if the maximum value of the synthetic wavelengths, that is to say the longest synthetic wavelength, is not less than the maximum value of the length measuring range, the wavelength scan is unnecessary. Moreover, even when the synthetic wavelength is expanded by adding a light source without the wavelength scan, the absolute length measurement can be performed. As another method, the wavelength of the light source 1 is scanned, and thereby the absolute length measurement may be performed without an additional light source. In this case, since the wavelength scanning amount which is required in the light source 1 becomes larger, about 10 nm, the use of not DFB-LD but an external cavity diode laser or the like is needed.

After the order of interference $N_1$ of the fundamental beam dispersion measurement beam is determined by expression (26), the order of interference $N_2$ of the second harmonic beam dispersion measurement beam is calculated by expression (27).

[Expression 27]

$$N_2 = \text{round}\left(\frac{\lambda_1}{\lambda_2} \frac{n(\lambda_2)}{n(\lambda_1)}(N_1 + \phi_1(\lambda_1)) - \phi_1(\lambda_2)\right) \quad (27)$$

The refractive index ratio of the fundamental beam and the second harmonic beam is required in the calculation of the order of interference $N_2$. This refractive index ratio may be calculated by the use of a fixed value or the result of an environment measurement depending on the estimated use environment of distance measurement interferometer.

Since the order of interferences $N_1$ and $N_2$ are determined by the above method, the process S200 is completed by calculating the absolute optical path length using expression (9).

The descriptions of processes S106 and S107 are omitted since it is similar to embodiment 1.

In a process S210, the absolute optical path length is calculated on the basis of the measurement result of the wavelength scanning beam and the fundamental beam as well as the process S200. Details are omitted since it is similar to the process S200.

In a process S111, the geometrical distance $L_2$ between the reference surface 52 and the target surface 53 in the distance measurement interferometer is calculated from the air dispersion ratio calculation result in the process S107, the absolute optical path length calculation result in the process S210, and the water vapor partial pressure measurement result in the distance measurement interferometer 50 in the process S111 as well as embodiment 1.

As described above, since the absolute distance measurement becomes possible by embodiment 2 without the initialization operation, and as a result, the convenience of the measurement improves. Furthermore, the distance measurement can be performed with high accuracy without the influence of the fluctuation of the air refractive index even in the use where the relative length measurement is difficult, for example a laser trucker.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-183603, filed Aug. 19, 2010 which is hereby incorporated by reference herein in its entirety.

What is claimed is:

1. An optical interferometer that calculates a geometrical distance of an optical path length difference between a reference surface and a target surface by measuring the optical path length difference using a multi-wavelength light source for interference measurement, the optical interferometer comprising:
  a light source for partial pressure measurement;
  a dispersion measurement interferometer for measuring a dispersion of air for wavelengths of the multi-wavelength light source;
  a first partial pressure detector for measuring a partial pressure of a component gas in air in the dispersion measurement interferometer;
  a distance measurement interferometer for measuring the optical path length difference between the reference surface and the target surface with respect to the wavelengths of the multi-wavelength light source;
  a second partial pressure detector for measuring a partial pressure of the component gas in air in the distance measurement interferometer; and
  an analyzer configured to calculate an air dispersion ratio of air in the dispersion measurement interferometer excluding the component gas on the basis of a detection result of the first partial detector, to calculate dispersion of the air in the distance measurement interferometer from the calculated air dispersion ratio and a detection result of the second partial pressure detector, and to calculate the geometrical distance of the optical path length difference between the reference surface and the target surface.

2. The optical interferometer according to claim 1, wherein the analyzer calculates the geometrical distance of the optical path length difference between the reference surface and the target surface by the following expression:

$$\frac{K(\lambda_1)}{K(\lambda_2)} = \frac{OPL_1(\lambda_1) - 2L_1 \cdot g(\lambda_1) \cdot P_{w1}}{OPL_1(\lambda_2) - 2L_1 \cdot g(\lambda_2) \cdot P_{w1}}$$

$$L_2 = \frac{\frac{K(\lambda_1)}{K(\lambda_2)} OPL_2(\lambda_2) - OPL_2(\lambda_1)}{\frac{K(\lambda_1)}{K(\lambda_2)} - 1 + p_{w2}\left(g(\lambda_1) - g(\lambda_2)\frac{K(\lambda_1)}{K(\lambda_2)}\right)}$$

where $K(\lambda_1)/K(\lambda_2)$ represents the air dispersion ratio of air in the dispersion measurement interferometer excluding the component gas, $\lambda_1$ represents a wavelength of a fundamental beam of the multi-wavelength light source, $\lambda_2$ represents a wavelength of a second harmonic beam of the multi-wavelength light source, $OPL_1(\lambda_1)$ and $OPL_1(\lambda_2)$ represent an optical path length of each wavelength of the multi-wavelength light source in the dispersion measurement interferometer, $L_1$ represents a length of a vacuum cell of the dispersion measurement interferometer, $g(\lambda_1)$ and $g(\lambda_2)$ represent dispersion of the component gas in each wavelength of the multi-wavelength light source, $p_{w1}$ presents the partial pressure of the component gas in the dispersion measurement interferometer, $L_2$ represents the geometrical distance, $OPL_2(\lambda_1)$ and $OPL_2(\lambda_2)$ represent a optical path length of each wavelength of the multi-wavelength light source in the distance measurement interferometer, and pw2 represents the partial pressure of the component gas in the distance measurement interferometer.

3. The optical interferometer according to claim 1, wherein the partial pressure of the component gas is respectively calculated from a transmittance of the component gas.

4. The optical interferometer according to claim 1, wherein a wavelength of the light source for partial pressure measurement is an absorption-line wavelength of the component gas.

5. The optical interferometer according to claim 1, wherein the component gas is water vapor.

6. The optical interferometer according to claim 1, wherein the analyzer determines an order of interference of the optical path length in each of the dispersion measurement interferometer and the distance measurement interferometer from optical path length measurement results of a plurality of wavelengths of the multi-wavelength light source.

7. The optical interferometer according to claim 6, wherein at least one of the wavelengths of the multi-wavelength light source is useable for a wavelength scan, and a synthetic wavelength is generated by the at least one and another wavelength of the wavelengths of the multi-wavelength light source.

8. The optical interferometer according to claim 6, when a synthetic wavelength of two wavelengths $\lambda_a$ and $\lambda_b$ is defined as $\lambda_a \cdot \lambda_b / |\lambda_a - \lambda_b|$,
  wherein a maximum value of (a) a first synthetic wavelength of two of the plurality of wavelengths in the multi-wavelength light source, (b) a second synthetic wavelength acquired by synthesizing the first synthetic wavelength with another wavelength among the plurality of wavelengths in the multi-wavelength light source, and (c) a third synthetic wavelength acquired by synthesizing the first synthetic wavelength with another synthetic wavelength, is larger than a maximum value of length ranges of the dispersion measurement interferometer and the distance measurement interferometer.

* * * * *